(12) United States Patent
Garbe et al.

(10) Patent No.: US 8,996,268 B2
(45) Date of Patent: Mar. 31, 2015

(54) METHOD AND APPARATUS FOR CONTROLLING A BRAKE SYSTEM FOR A MOTOR VEHICLE HAVING A BRAKE DEVICE

(71) Applicant: Dr. Ing. h.c.F. Porsche Aktiengesellschaft, Stuttgart (DE)

(72) Inventors: Thomas Garbe, Affalterbach (DE); Bjoern-Hendrik Reinhard, Bad Liebenzell (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/646,024

(22) Filed: Oct. 5, 2012

(65) Prior Publication Data

US 2013/0090824 A1 Apr. 11, 2013

(30) Foreign Application Priority Data

Oct. 7, 2011 (DE) .................. 10 2011 054 290

(51) Int. Cl.
*B60T 8/1755* (2006.01)
*B60T 1/10* (2006.01)
(Continued)

(52) U.S. Cl.
CPC ... *B60T 1/10* (2013.01); *B60T 8/00* (2013.01); *B60L 7/26* (2013.01); *B60T 13/586* (2013.01);
(Continued)

(58) Field of Classification Search
CPC ...... B62D 5/0463; B62D 7/159; B62D 6/008; B62D 6/003; B60T 8/1755
USPC .......... 701/1, 22, 31.4, 70, 71, 75, 78, 79, 80; 303/3, 20, 152; 188/156
See application file for complete search history.

(56) References Cited

U.S. PATENT DOCUMENTS 6,658,327 B1 * 12/2003 Reppich et al. .................. 701/1
2004/0251095 A1 12/2004 Simard et al.
(Continued)

FOREIGN PATENT DOCUMENTS

DE 10 2009 039 347 3/2011
DE 10 2010 040 190 3/2012
(Continued)

OTHER PUBLICATIONS

German Search Report of Aug. 22, 2012.

*Primary Examiner* — Helal A Algahaim
*Assistant Examiner* — Jelani Smith
(74) *Attorney, Agent, or Firm* — Gerald E. Hespos; Michael J. Porco; Matthew T. Hespos

(57) ABSTRACT

A method is provided for controlling a brake system of a motor vehicle having a brake device (40) with a hydraulic brake unit (41) and a recuperation brake unit (42). The method includes calculating (S1) a hydraulic brake force characteristic curve (B2) of the hydraulic brake unit (41) on the basis of at least one detected characteristic of the brake system, selecting (S2) a generator-based brake force characteristic curve (G1-G4) of the recuperation brake unit (42) on the basis of a predefined criterion and as a function of the calculated hydraulic brake force characteristic curve (B2), and controlling (S3) the hydraulic brake unit (41) and the recuperation brake unit (42) in accordance with a detected degree of actuation of the brake pedal (10), the calculated hydraulic brake force characteristic curves (B2), and the selected generator-based brake force characteristic curve (G1-G4).

13 Claims, 5 Drawing Sheets

(51) Int. Cl.
*B60T 8/00* (2006.01)
*B60L 7/26* (2006.01)
*B60T 13/58* (2006.01)
*B60W 10/08* (2006.01)
*B60W 10/188* (2012.01)
*B60W 20/00* (2006.01)
*B60W 30/18* (2012.01)
*B60L 7/10* (2006.01)
*B60L 7/18* (2006.01)

(52) U.S. Cl.
CPC ............. *B60W 10/08* (2013.01); *B60W 10/188* (2013.01); *B60W 20/00* (2013.01); *B60W 30/18127* (2013.01); *B60L 7/10* (2013.01); *B60L 7/18* (2013.01); *B60W 2540/12* (2013.01); *B60W 2710/083* (2013.01); *B60T 2270/604* (2013.01)

USPC ........ 701/70; 701/1; 701/22; 701/71; 303/20; 303/152; 303/156

(56) References Cited

U.S. PATENT DOCUMENTS

| | | |
|---|---|---|
| 2005/0143878 A1* | 6/2005 | Park et al. ................ 701/22 |
| 2006/0220452 A1 | 10/2006 | Emmerich et al. |
| 2009/0118887 A1 | 5/2009 | Minarcin et al. |
| 2012/0139330 A1* | 6/2012 | Morishita .................. 303/3 |

FOREIGN PATENT DOCUMENTS

| | | |
|---|---|---|
| JP | 06-153313 | 5/1994 |
| JP | 08-182109 | 7/1996 |
| JP | 2006321429 | 11/2006 |
| WO | 2010/049945 | 5/2010 |

* cited by examiner

METHOD AND APPARATUS FOR CONTROLLING A BRAKE SYSTEM FOR A MOTOR VEHICLE HAVING A BRAKE DEVICE

CROSS REFERENCE TO RELATED APPLICATION

This application claims priority under 35 USC 119 to German Patent Appl. No. 10 2011 054 290.6 filed on Oct. 7, 2011, the entire disclosure of which is incorporated herein by reference.

BACKGROUND OF THE INVENTION

1. Field of the Invention

The invention relates to a method and an apparatus for controlling a brake system for a motor vehicle.

2. Description of the Related Art

DE 10 2009 039 347 A1 relates to a method for operating a hybrid vehicle, in which a total braking torque during a braking operation of the motor vehicle is provided at least partially by at least one electric machine of the motor vehicle. A time is determined at which a substantially continuous termination of the total braking torque by the electric machine is commenced.

US 2006/0220452 A1 describes a method for controlling a regenerative brake system of a motor vehicle having friction brakes and an electric generator. A software module controls the method. The method uses an electrically controllable generator and a number of hydraulic friction brakes in a parallel configuration. A setpoint braking torque of the generator is determined based on a total setpoint deceleration, and the generator is controlled on the basis of the setpoint braking torque.

US 2009/0118887 A1 describes a method for controlling a brake system that has an electric generator and hydraulic friction brakes. The control method comprises a regenerative braking action and a braking action by the hydraulic friction brake. A vehicle operating point also is monitored and a prevailing braking torque is determined for determining a regenerative braking action and actuating the friction brake.

WO 2010/049945 A1 relates to a method for activating an anti-lock braking system in a vehicle driven at least by an electric motor. The method compares the actual speed of the vehicle with the speed of a drive element of the drivetrain of the vehicle to identify an onset of locking of at least one wheel of the vehicle. Regenerative braking is modulated periodically based on a detected onset of locking of one wheel of the vehicle to prevent further locking of the wheels of the vehicle. Thus, the method improves driving safety and reduces wear to the treads of the wheels.

US 2004/0251095 A1 describes a brake system for electric vehicles that permits a recovery of kinetic energy. A feedback force generator is provided to give the driver of the electric vehicle the impression that a hydraulic brake system is used.

Against this background, an object of the invention is to provide a method and a device for controlling a brake system for a motor vehicle so that the brake system is adapted optimally to characteristics of the brake system.

SUMMARY OF THE INVENTION

The invention relates to a method for controlling a brake system for a motor vehicle. The brake system has a brake device with a hydraulic brake unit and a recuperation brake unit. The method is designed to detect a degree of actuation of a brake pedal and at least one characteristic of the brake system. The method includes: calculating a hydraulic brake force characteristic curve of the hydraulic brake unit on the basis of the detected characteristic of the brake system; selecting a generator-based brake force characteristic curve of the recuperation brake unit from a characteristic map on the basis of a predefined criterion and as a function of the calculated hydraulic brake force characteristic curve; and controlling the hydraulic brake unit and the recuperation brake unit in accordance with the detected degree of actuation of the brake pedal on the basis of the calculated hydraulic brake force characteristic curves and the selected generator-based brake force characteristic curve.

The invention also relates to an apparatus for controlling a brake system for a motor vehicle having a brake device with a hydraulic brake unit and a recuperation brake unit. The brake system is designed to detect a degree of actuation of a brake pedal and at least one characteristic of the brake system. The brake device calculates a hydraulic brake force characteristic curve of the hydraulic brake unit on the basis of the at least one detected characteristic of the brake system and selects a generator-based brake force characteristic curve of the recuperation brake unit from a characteristic map on the basis of a predefined criterion and as a function of the calculated hydraulic brake force characteristic curve. The hydraulic brake unit and the recuperation brake unit are controlled in accordance with the detected degree of actuation of the brake pedal on the basis of the calculated hydraulic brake force characteristic curves and the selected generator-based brake force characteristic curve.

The invention attains a maximum utilization of the electrical energy obtained by recuperation during the generator-based deceleration and optimizes the brake system for maximum recuperation in view of the respective component tolerances of the hydraulic service brake or further influential variables.

The invention has an advantage over the abovementioned approaches in that the electrical energy gained by generator-based deceleration is maximized.

The invention also attains a convenient system with reduced brake idle travels and permits an adaptation of the brake pedal characteristic curve during the generator-based deceleration in which only a slight follow-up depression of the pedal by the driver is necessary.

The at least one characteristic of the brake system that is to be used in the invention may include a degree of actuation of the brake pedal at which an onset of a brake force of the hydraulic brake unit occurs.

The selection of the generator-based brake force characteristic curve of the recuperation brake unit may use a criterion for minimizing a plateau region that occurs in the brake pedal characteristic curve diagram of the generator-based brake force characteristic curve.

The selection of the generator-based brake force characteristic curve of the recuperation brake unit may use a criterion for maximizing an energy efficiency of an energy recovery of the recuperation brake unit.

The at least one characteristic of the brake system to be detected may be detected upon starting the motor vehicle.

The at least one characteristic of the brake system to be detected may be detected upon a depression of the brake pedal of the motor vehicle.

The at least one characteristic of the brake system to be detected may be detected newly in each case at time intervals during operation of the motor vehicle. Thus, changes in the braking behavior of the hydraulic brake unit can be detected and the braking power of the recuperation brake unit can be adapted accordingly.

The criterion of the brake system to be detected may include a degree of actuation of the brake pedal at which an onset of a brake force of the hydraulic brake unit occurs. Thus, the invention can achieve an energy-efficient combination of generator-based braking and mechanical braking.

The brake device may be designed to minimize a plateau region occurring in the brake pedal characteristic curve diagram of the generator-based brake force characteristic curve through the selection of the generator-based brake force characteristic curve of the recuperation brake unit.

The brake device may be designed to maximize an energy efficiency of an energy recovery of the recuperation brake unit through the selection of the generator-based brake force characteristic curve of the recuperation brake unit.

The criterion of the brake system to be detected preferably is detected upon starting the motor vehicle. Thus, the hydraulic brake force characteristic curve of the hydraulic brake unit can be detected without a disturbance perceptible to the driver.

The brake device preferably detects the at least one criterion of the brake system to be detected upon a depression of the brake pedal of the motor vehicle. Thus, the detection of the characteristic of the hydraulic brake unit can ensure that wear-induced changes to the hydraulic brake force characteristic curve will not result in a decrease in energy efficiency of the brake system.

Further features and advantages of embodiments of the invention will emerge from the following description with reference to the appended drawings.

DETAILED DESCRIPTION OF THE PREFERRED EMBODIMENTS

Figure 1:
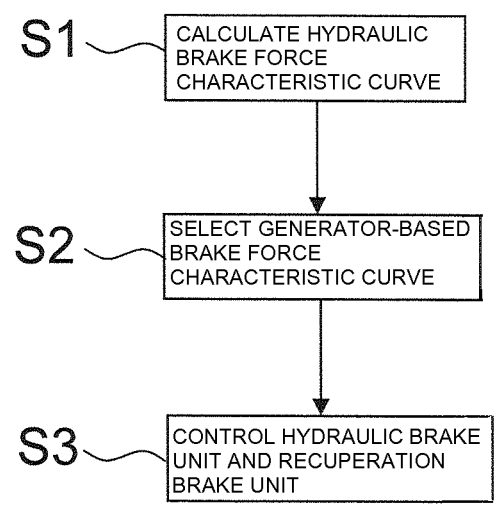
FIG. 1 is a flow diagram illustrating an embodiment of the method according to the invention for controlling a brake system of a motor vehicle.

FIG. 1 is a flow diagram illustrating an embodiment of the method according to the invention for controlling a brake system for a motor vehicle. Method step S1 calculates a hydraulic brake force characteristic curve B2 of the hydraulic brake unit 41 on the basis of the detected characteristic of the brake system. It is thus possible during the method step S1 to determine the brake pedal travel at which the brake linings of the hydraulic brake unit 41 come into contact with the brake disks 20. From that point onward, a further pedal actuation leads to a continuous increase in the brake pressure, and the hydraulic brake unit 41 becomes active. Useful recuperation energy is lost as the superposition of mechanical braking on generator-based braking begins.

Method step S2 selects a generator-based brake force characteristic curve of the recuperation brake unit 42 from a characteristic map. The selection takes place on the basis of a predefined criterion as a function of the calculated hydraulic brake force characteristic curve B2. The greater the recuperation torque, the more efficient the energy recovery of the brake system.

The brake system controls the hydraulic brake unit 41 and the recuperation brake unit 42 in method step S3 in accordance with the detected degree of actuation of the brake pedal 10 on the basis of the calculated hydraulic brake force characteristic curves B2 and the selected generator-based brake force characteristic curve G4.

Method steps S1 and S2 can be repeated as often as desired during driving.

Figure 2:
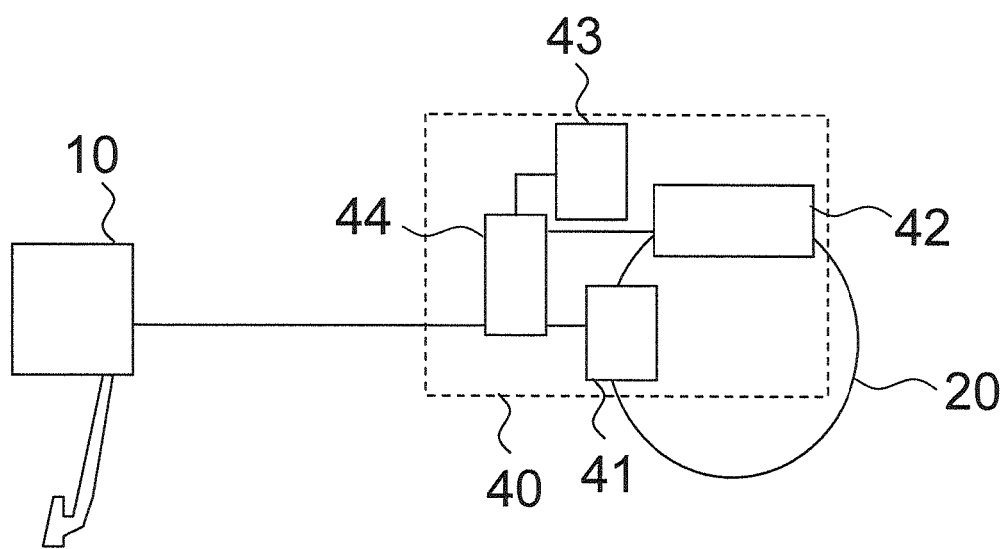
FIG. 2 is a schematic illustration of an embodiment of the apparatus of the invention for controlling a brake system for a motor vehicle.

FIG. 2 is a schematic illustration of an apparatus according to the invention for controlling a brake system of a motor vehicle. The brake system comprises a brake device 40 with a hydraulic brake unit 41 with a brake disk 20. The brake device 40 has a control unit 44 and a recuperation brake unit 42 and is designed to detect a degree of actuation of a brake pedal 10 and at least one criterion of the brake system.

The brake device 40 is designed for example to calculate a hydraulic brake force characteristic curve B2 of the hydraulic brake unit 41 on the basis of the detected criterion of the brake system. The brake device 40 also optionally is used to select a generator-based brake force characteristic curve G1-G4, determined by a parameter "t" of the recuperation brake unit 42 from a characteristic map stored in a characteristic map memory 43 of the brake device 40.

The hydraulic brake unit 41 and the recuperation brake unit 42 can be controlled by the brake device 40, for example, in accordance with the detected degree of actuation of the brake pedal 10 on the basis of the hydraulic brake force characteristic curves B1, B2, B3 and the generator-based brake force characteristic curve G1-G4.

The recuperation brake unit 42 may be an electromotive brake, an electric generator brake or an electric drive motor that is used as a generator during braking.

The control unit 44 may be a programmable logic controller or a controller that can be programmed digitally in some other way for controlling the brake system.

The hydraulic brake unit 41 may be a disk brake or some other brake in which a brake disk 20 decelerates the vehicle. The brake disk 20 is fastened to the wheel hub and is engaged by a brake pad with brake linings in the brake caliper.

Figure 3:
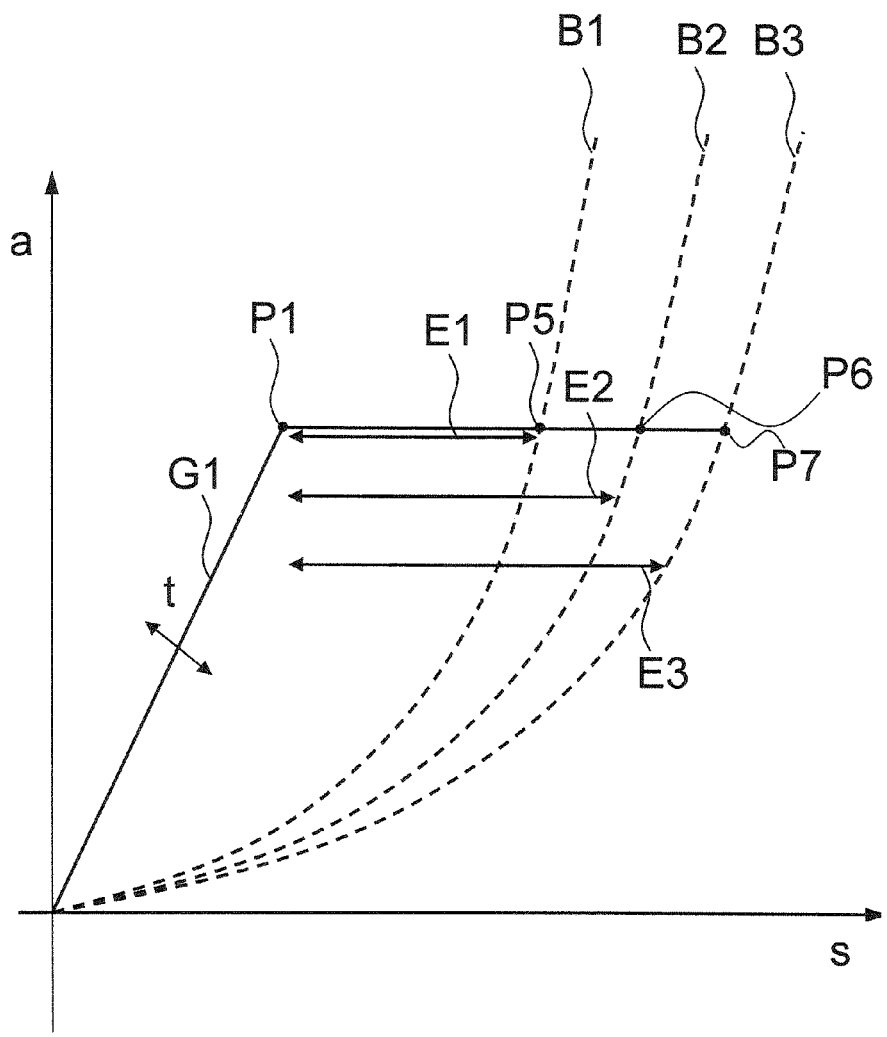
FIGS. 3-5 are brake pedal characteristic curve diagrams with brake pedal characteristic curves of the brake system for a motor vehicle, according to a further embodiment of the invention.

FIG. 3 shows a brake pedal characteristic curve diagram with brake pedal characteristic curves of a brake system according to an embodiment of the invention.

The travel or degree of depression of the brake pedal 10 of FIG. 2 is denoted by the letter "s" on the abscissa of FIG. 3, while a magnitude of deceleration "sa" of the motor vehicle is indicated on the ordinate.

The brake system controls the generator-based braking and the mechanical braking. Every pedal position of the brake pedal 10 reproducibly is assigned a certain deceleration during generator-based braking of the recuperation brake unit 42. However, the fixed relationship does not exist in the case of mechanical braking by the hydraulic brake unit 41.

For example, the mechanical brake may have to compensate for a reduction of the generator-based braking action that may arise during the stopping process. This is performed, for example, by a follow-up depression of the brake pedal or by control of a hydraulic assembly of the brake system. This permits, for example, an increased mechanical braking deceleration of the hydraulic brake unit 41 as the generator-based braking power of the recuperation brake unit 42 decreases.

The dashed lines of FIG. 3 illustrates different hydraulic brake force characteristic curves B1, B2, B3 of the hydraulic brake unit 41 resulting from component tolerances in a series production vehicle. This leads to a different behavior of the hydraulic brake unit 41, as illustrated by the brake force characteristic curves B1 and B3 as extreme values of the component tolerances and by the brake force characteristic curve B2 as a mean value of the component tolerances.

The brake pedal characteristic curve diagram also illustrates a generator-based brake force characteristic curve G1 that is generated by operation of the electric machine as a generator. The generator-based brake force characteristic curve G1 has a bend at the characteristic curve point P1. Horizontal plateau regions E1, E2, E3 extend from the characteristic curve point P1 and differ depending on the respective hydraulic brake force characteristic curve B1, B2, B3. The points of intersection of the hydraulic brake force characteristic curve B1, B2, B3 with the generator-based brake force characteristic curve G1 are labeled as characteristic curve points P5, P6 and P7.

The larger horizontal plateau regions E1, E2, E3 are more likely to be perceived by the driver.

Therefore, a criterion used by the method, is that the gradient t of the linearly rising region of the generator-based brake force characteristic curve G1 and the position of the point P1 are made variable.

For this purpose, the method initially determines the characteristic curve point on the hydraulic brake force characteristic curve B2 at which the brake linings of the hydraulic brake unit 41 begin to make contact, that is to say the hydraulic brake unit 41 of the motor vehicle provides braking power. Braking is performed substantially only with the hydraulic brake unit 41 at positions beyond the characteristic curve point.

The determination is performed, for example, upon starting the motor vehicle, because hybrid vehicles conventionally are equipped with an automatic transmission, and therefore a depression of the brake pedal 10 is required upon starting the vehicle.

The generator-based activation of the electric machine of the recuperation brake unit 42, in particular the gradient t of the straight line G1 and the position of the characteristic curve point P1, then are set so that the characteristic curve point P1 that constitutes the maximum braking power of the recuperation brake unit 42 reliably precedes the determined characteristic curve point P5, P6 or P7, because the hydraulic brake unit 41 of the motor vehicle begins to act at the characteristic curve point P5, P6 or P7.

Figure 4:
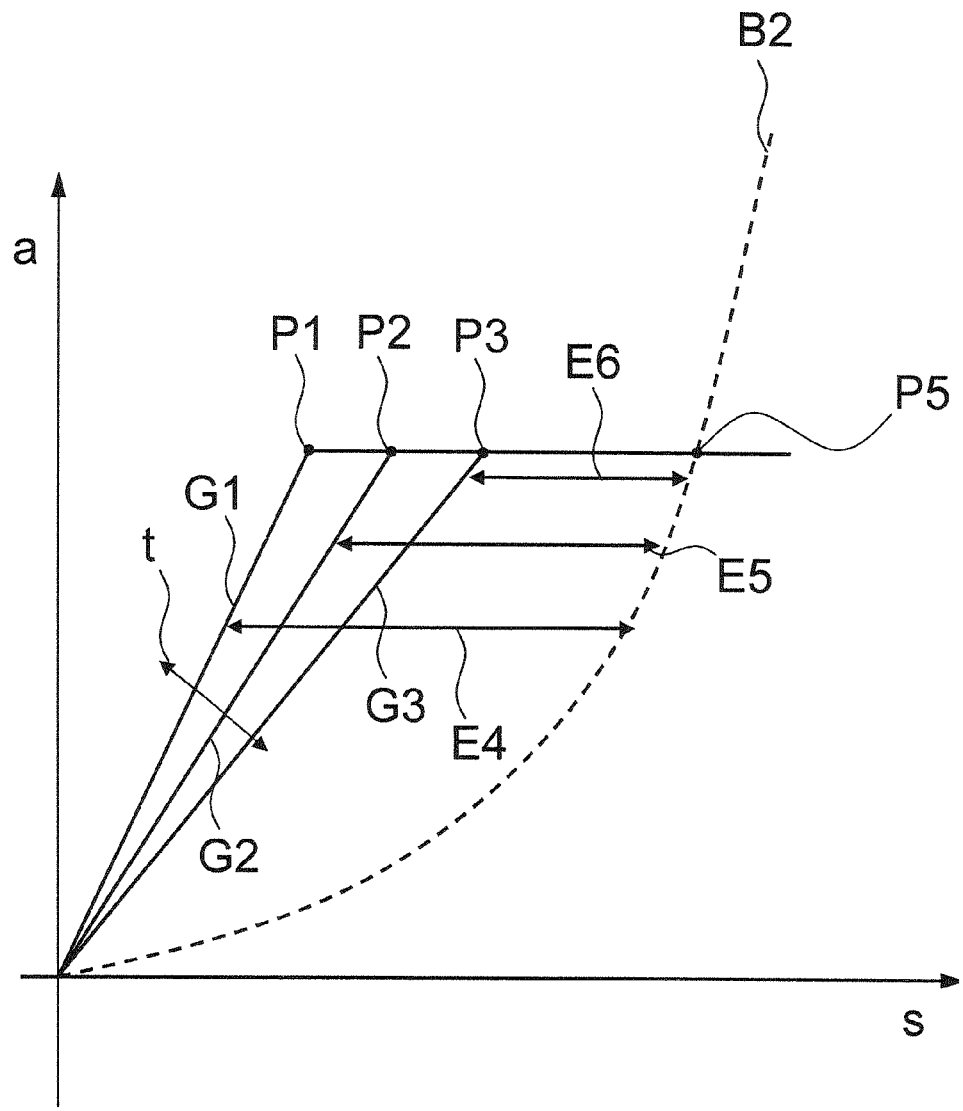

FIG. 4 shows a brake pedal characteristic curve diagram with brake pedal characteristic curves of the brake system for a motor vehicle according to a further embodiment of the invention. The brake pedal travel "s" is on the abscissa, and the magnitude of deceleration "a" of the motor vehicle is on the ordinate, as in FIG. 3.

The brake pedal characteristic curve diagram illustrates different generator-based brake force characteristic curves G1-G3 with different gradients t for the linearly rising regions of the generator-based brake force characteristic curves G1-G3 and correspondingly different lengths of the plateau regions E4-E6. The transitions between the linear regions of the generator-based brake force characteristic curves G1-G3 and the plateau regions E4-E6 are denoted by the characteristic curve points P1-P3.

For example, a criterion used by the brake system may be to minimize the length of the plateau regions E4-E6. However, in the event of a tolerance-induced miscalculation of the onset of the generator-based braking power of the hydraulic brake unit 41 can remain unutilized, and therefore the energy efficiency of the brake system falls.

Figure 5:
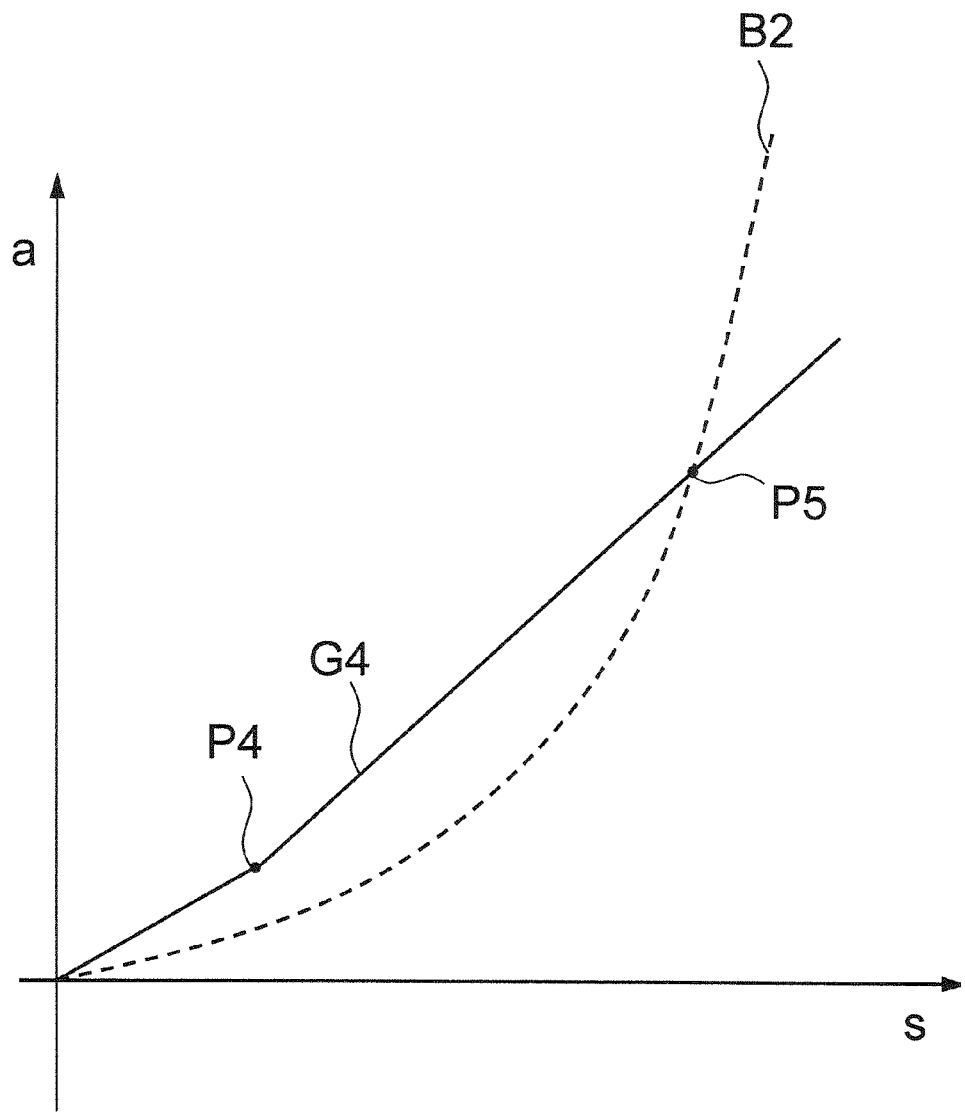

FIG. 5 shows a brake pedal characteristic curve diagram having a brake pedal characteristic curve of the brake system for a motor vehicle according to a further embodiment of the invention. Similar to FIGS. 3 and 4, the brake pedal travel "s" is on the abscissa and a magnitude of a deceleration "a" of the motor vehicle is on the ordinate.

By contrast to the examples of FIGS. 3 and 4, the illustrated generator-based brake force characteristic curve G4 has two regions that rise linearly with different gradients and are divided by the characteristic curve point P4. The division of the brake force characteristic curve G4 into a first region with a relatively shallow gradient and a second region with a relatively steep gradient avoids a need for an elongation of the idle travel of the brake force characteristic curve that is perceived by the driver.

The generator-based brake force characteristic curve G4 intersects the hydraulic brake force characteristic curve B2 at the characteristic curve point P5. Further determinations of point P5 may be carried out during a journey of the motor vehicle to also be able to take changing operating conditions into consideration. Furthermore, the gradient t of the generator-based brake force characteristic curve G1-G4 and the position of the point P5 can be adapted. The minimization of the plateau regions, such as is used as a criterion by the brake system, encompasses a shortening of the length of the plateau regions E4-E6 to zero, as in the generator-based brake force characteristic curve G4 of FIG. 5. Such a brake force characteristic curve G4 thus has no idle travel, and the driver experiences a braking torque which, over the entire range of the pedal characteristic curve, increases continuously with increasing actuation of the brake pedal 10.

The invention has been described on the basis of preferred exemplary embodiments, but is not restricted thereto and can be modified in a variety of ways.

What is claimed is:

1. A method for controlling a brake system for a motor vehicle, having a brake device with a hydraulic brake unit and a recuperation brake unit, the method comprising:
   detecting a degree of actuation of a brake pedal;
   detecting at least one characteristic of the brake system;
   calculating a hydraulic brake force characteristic curve of the hydraulic brake unit based on the detected characteristic of the brake system;
   providing a characteristic map having plurality of generator-based brake force characteristic curves of the recuperation brake unit, each of the generator-based brake force characteristic curves having first and second gradients, at least the first gradients being different from one another;
   selecting one of the generator-based brake force characteristic curves from the characteristic map based on a predefined criterion relating at least partly to an amount of brake pedal travel from a transition point between the first and second gradients of the generator-based brake force characteristic curves and the calculated hydraulic brake force characteristic curve; and
   controlling the hydraulic brake unit and the recuperation brake unit in accordance with the detected degree of actuation of the brake pedal based on the calculated hydraulic brake force characteristic curves and the selected generator-based brake force characteristic curve.

2. The method of claim 1, wherein the at least one characteristic of the brake system to be detected includes a degree of actuation of the brake pedal at which an onset of a brake force of the hydraulic brake unit occurs.

3. The method of claim 1, wherein the second gradient of each of the generator-based brake force characteristic curves of the recuperation brake unit is a plateau region, and wherein the generator-based brake force characteristic curve is selected to minimize the plateau region in the brake pedal characteristic curve diagram of the generator-based brake force characteristic curve.

4. The method of claim 1, wherein the generator-based brake force characteristic curve of the recuperation brake unit is selected to maximize an energy efficiency of an energy recovery of the recuperation brake unit.

5. The method of claim 1, wherein the step of detecting at least one characteristic of the brake system comprises detecting at least one characteristic of the brake system upon starting of the motor vehicle.

6. The method of claim 1, wherein the step of detecting at least one characteristic of the brake system comprises detecting at least one characteristic of the brake system upon depressing the brake pedal of the motor vehicle.

7. The method of claim 1, wherein the step of detecting at least one characteristic of the brake system comprises detecting at least one characteristic of the brake system at time intervals during operation of the motor vehicle.

8. An apparatus for controlling a brake system for a motor vehicle, having a brake device with a hydraulic brake unit and a recuperation brake unit, the apparatus comprising:
   at least one detector to detect a degree of actuation of a brake pedal and at least one characteristic of the brake system;
   calculating means associated with the brake device for calculating a hydraulic brake force characteristic curve of the hydraulic brake unit based on the at least one characteristic of the brake system detected by the detector;
   a memory storing a characteristic map of a plurality of generator-based brake force characteristic curves, each of which has a region with a first gradient and a region with a second gradient, at least the first gradients being different from one another;
   selecting means for selecting one of the generator-based brake force characteristic curves of the recuperation brake unit from the characteristic map on the basis of a predefined criterion relating at least partly to an amount of brake pedal travel from a transition point between the first and second gradients of the generator-based brake force characteristic curves and the calculated hydraulic brake force characteristic curve; and
   a controller for controlling the hydraulic brake unit and the recuperation brake unit in accordance with the detected degree of actuation of the brake pedal, the calculated hydraulic brake force characteristic curves and the selected generator-based brake force characteristic curve.

9. The apparatus of claim 8, wherein the at least one detector to detect at least one characteristic of the brake system brake device comprises at least one detector to detect a degree of actuation of the brake pedal at which an onset of a brake force of the hydraulic brake unit occurs.

10. The apparatus of claim 8, wherein the second gradient defines a plateau region and the selecting means for selecting a generator-based brake force characteristic curve of the recuperation brake unit of the brake device is configured for selecting the generator-based brake force characteristic curve where the plateau region in the brake pedal characteristic curve diagram is a minimum.

11. The apparatus of claim 8, wherein the selecting means for selecting a generator-based brake force characteristic curve of the recuperation brake unit of the brake device is configured for selecting the generator-based brake force characteristic curve of the recuperation brake unit to maximize an energy efficiency of an energy recovery of the recuperation brake unit.

12. The apparatus of claim 8, wherein the at least one detector is designed to detect a degree of actuation of a brake pedal and at least one characteristic of the brake system upon starting the motor vehicle.

13. The apparatus of claim 8, wherein the at least one detector is designed to detect a degree of actuation of a brake pedal and at least one characteristic of the brake system upon a depression of the brake pedal of the motor vehicle.

\* \* \* \* \*